(12) United States Patent
Ferris et al.

(10) Patent No.: US 8,285,787 B2
(45) Date of Patent: Oct. 9, 2012

(54) SYSTEMS AND METHODS FOR MANAGING A COLLABORATION SPACE HAVING APPLICATION HOSTING CAPABILITIES

(75) Inventors: James Michael Ferris, Cary, NC (US); David Huff, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 264 days.

(21) Appl. No.: 12/324,186

(22) Filed: Nov. 26, 2008

(65) Prior Publication Data

US 2010/0131859 A1 May 27, 2010

(51) Int. Cl.
G06F 15/16 (2006.01)
(52) U.S. Cl. ......... 709/204; 709/217; 709/223; 717/101
(58) Field of Classification Search .......... 709/203–205, 709/217, 223; 715/760; 717/101, 127
See application file for complete search history.

(56) References Cited

U.S. PATENT DOCUMENTS

| | | | |
|---|---|---|---|
| 6,195,694 B1 | 2/2001 | Chen et al. | |
| 7,162,528 B1 * | 1/2007 | Simonoff et al. | 709/205 |
| 7,467,018 B1 | 12/2008 | Callaghan | |
| 7,668,913 B1 * | 2/2010 | Underwood et al. | 709/203 |
| 7,890,333 B2 * | 2/2011 | Da Palma et al. | 704/270.1 |
| 7,941,399 B2 * | 5/2011 | Bailor et al. | 715/711 |
| 8,074,202 B2 * | 12/2011 | Da Palma et al. | 717/110 |
| 2004/0068714 A1 * | 4/2004 | Deimel et al. | 717/101 |
| 2006/0031838 A1 * | 2/2006 | Chrabieh | 718/100 |
| 2007/0198534 A1 | 8/2007 | Hon et al. | |
| 2007/0219659 A1 * | 9/2007 | Abhyanker et al. | 700/98 |
| 2007/0294348 A1 | 12/2007 | Cohen et al. | |
| 2008/0010249 A1 | 1/2008 | Curtis et al. | |
| 2008/0010338 A1 | 1/2008 | Curtis et al. | |
| 2008/0059539 A1 * | 3/2008 | Chin et al. | 707/203 |
| 2008/0216056 A1 * | 9/2008 | Bate et al. | 717/127 |
| 2008/0270915 A1 * | 10/2008 | Tevanian et al. | 715/751 |
| 2008/0319742 A1 * | 12/2008 | Da Palma et al. | 704/235 |
| 2008/0319762 A1 * | 12/2008 | Da Palma et al. | 704/275 |
| 2008/0320000 A1 | 12/2008 | Gaddam | |
| 2009/0132651 A1 | 5/2009 | Roger et al. | |
| 2009/0259572 A1 | 10/2009 | Lay et al. | |
| 2009/0259945 A1 | 10/2009 | De Spiegeller | |
| 2010/0107088 A1 | 4/2010 | Hunt et al. | |
| 2010/0115612 A1 | 5/2010 | O'Brien et al. | |
| 2010/0131860 A1 | 5/2010 | DeHaan et al. | |
| 2010/0218237 A1 * | 8/2010 | Ferris et al. | 726/4 |
| 2011/0258592 A1 | 10/2011 | Paul et al. | |

OTHER PUBLICATIONS

USPTO; Office Action for U.S. Appl. No. 12/391,730, mailed Jan. 7, 2012. USPTO; Office Action for U.S. Appl. No. 12/391,730, mailed Jun. 28, 2011.
USPTO; Office Action for U.S. Appl. No. 12/391,730, mailed Oct. 21, 2011.
USPTO; Office Action for U.S. Appl. No. 12/391,730, mailed Mar. 14, 2012.

* cited by examiner

*Primary Examiner* — Ramy M Osman
(74) *Attorney, Agent, or Firm* — Lowenstein Sandler PC

(57) ABSTRACT

Embodiments relate to systems and methods for managing a collaboration space having application hosting capabilities. A collaboration space, such as a wiki site, can host a set of collaboration tools and resources, including, for example, content tools, communication tools, and other resources for the users of the space. The collaboration space can also incorporate a set of executable application resources, such as application programming tools to permit users to program, invoke, and execute applications directly from the wiki site or other collaboration space. The set of executable application resources can in turn be embedded or incorporated in a Web framework, for instance to permit the set of hosted applications to be served/run to remote clients as Web applications. Applications generated outside the collaboration space can in embodiments be migrated into the collaboration space and hosted and/or executed from within the collaboration space, even if not originally generated there.

15 Claims, 4 Drawing Sheets

SYSTEMS AND METHODS FOR MANAGING A COLLABORATION SPACE HAVING APPLICATION HOSTING CAPABILITIES

FIELD

The present teachings relate to systems and methods for managing a collaboration space having application hosting capabilities, and more particularly to platforms and techniques for deploying and managing wiki sites or other collaboration spaces, in which the space or site is equipped with executable application resources to develop and/or run software applications within the collaboration space itself.

BACKGROUND OF RELATED ART

Community collaboration platforms and websites are known which allow members from a public or private community to contribute to or modify content which is shared on the platforms and websites. One form of these platforms and websites is known as "wikis." In one application, software developers can utilize wikis as a platform for the developers and the community to submit updates, problems, fixes, messages and/or the like with the goal to help develop applications and other software. Opening up the platform to a community often facilitates the development of the software by providing users a platform to easily and freely submit bug fixes, updates and ideas. Existing collaboration platforms and software wikis, however, provide no mechanism to allow users to insert and execute software directly in the wiki site, itself. In other words, software development sites organized as wikis often contain content-management resources to accept source code, comments, email, or other content exchanges. However, those sites do not incorporate resources to permit contributors to the wiki to insert and execute applications within the wiki framework itself. Instead such sites typically present a link to redirect the user to another site or resource to attempt to run programs that may be stored or referenced in the wiki. It may be desirable to provide methods and systems for managing a wiki site or other collaboration space which include application hosting capabilities.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for managing a collaboration space having application hosting capabilities. More particularly, embodiments relate to platforms and techniques to support a wiki site or other collaboration space, incorporating a set of content resources or tools which permit a set of users to access the collaboration space, and upload, access and download content to and from the collaboration space. Those content tools can include, for example, email tools, code archive tools, instant messaging or other messaging tools, calendar or scheduling tools, or other tools or resources to help manage the content of information posted to and maintained by the wiki site or other collaboration space. In embodiments, the collaboration space can be supported by a collaboration server or other host. In embodiments, the collaboration server or other resources used to support the collaboration space can be extracted or maintained in a cloud computing environment.

According to embodiments, the collaboration space can likewise be configured to contain a set of executable application resources to permit a user to execute or instantiate one or more applications, from within the collaboration space. The set of executable application resources can include, for example, available application language or other interpreters, compilers, runtime environments, or other application resources to allow applications to be hosted and execute in the collaboration space, itself. In embodiments, the resulting wiki site or other collaboration site or space, can be referred to as a "piki" site or space. In embodiments, the set of hosted applications that reside or are instantiated in the collaboration space, can be configured as Web applications. The hosted Web applications can be served to one or more of the set of users, directly from the collaboration space.

Reference will now be made in detail to exemplary embodiments of the present teachings, which are illustrated in the accompanying drawings Where possible the same reference numbers will be used throughout the drawings to refer to the same or like parts.

Figure 1:
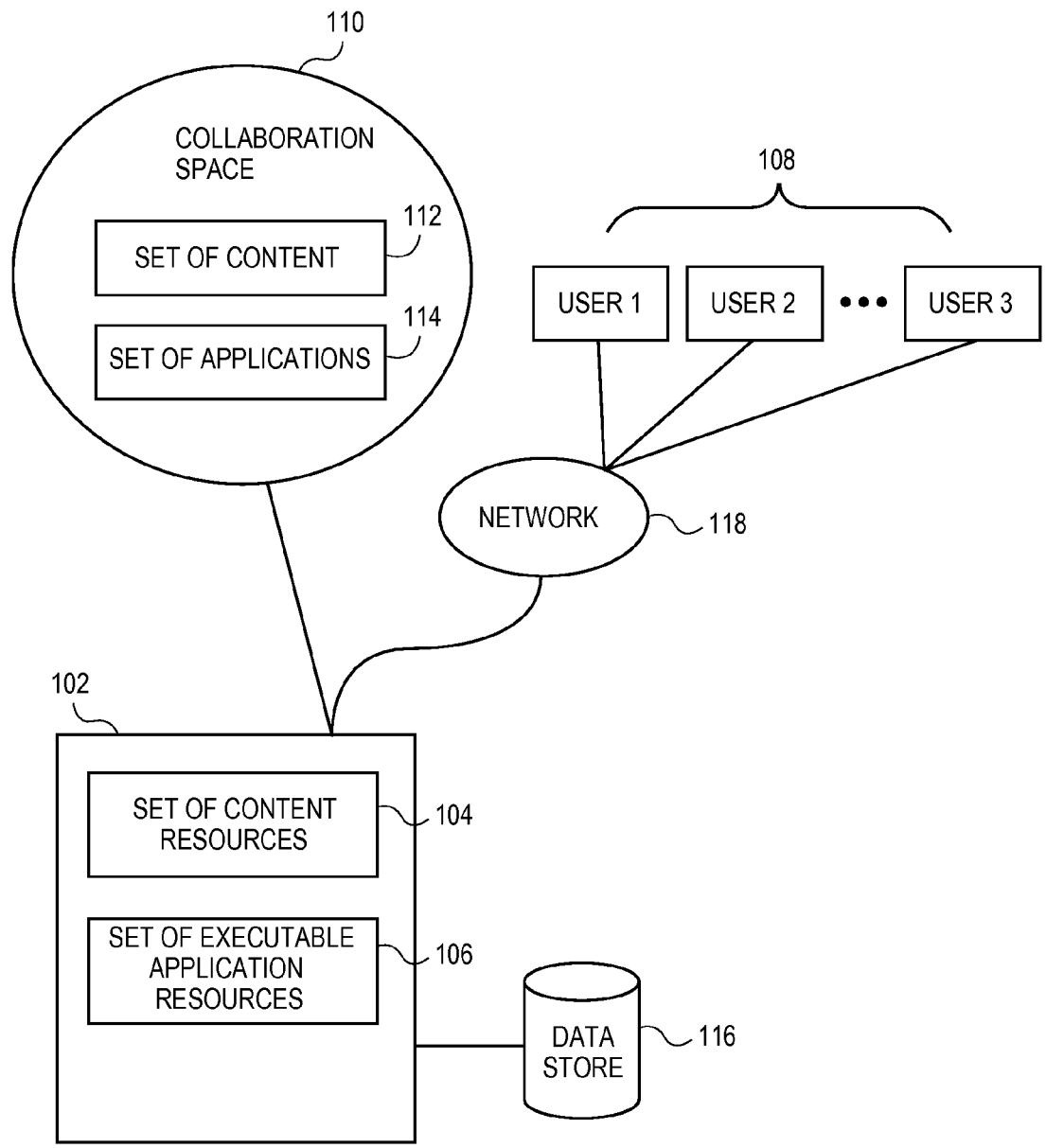
FIG. 1 illustrates an overall system for managing a collaboration space having application hosting capabilities, according to various embodiments.

FIG. 1 illustrates an overall system 100 consistent with systems and methods for managing a collaboration space having application hosting capabilities, according to various embodiments of the present teachings. In embodiments as shown, a collaboration space 110 can host or contain a set of content 112, as well as a set of applications 114. In embodiments, the collaboration space 110 can be or include a wiki site, space, or community. In embodiments, collaboration space 110 can host or support resources related to the development of software, such as applications, operating systems, or other software. The set of content 112 can include, for example, email or other messaging content, code storage or archives, blogs, or other media or content. The set of applications 114 can include, for example, applications such as software development applications, for instance, debugging tools, performance metric tools, or other applications.

The collaboration space 110 can be generated or supported by a collaboration server 102. Collaboration server 102 can communicate with a data store 116 to store code, content, applications, and/or other resources related to collaboration space 110. Collaboration server 102 can likewise comprise a set of content management resources 104, and a set of executable application resources 106. Set of content management resources 104 can comprise software and/or other tools to receive, maintain, and provide access to messaging, code, and other content or media hosted in collaboration space 110. Set of executable application resources 106 can comprise software and/or other tools to maintain, configure, and/or execute or instantiate applications or other software within collaboration space 110. Set of executable application resources 106 can comprise, for instance, application language frameworks, compilers or interpreters such as, for example, Python, PERL, Java™, Ruby on Rails, Visual Basic™ available from Microsoft Corp., Struts, or other languages, platforms, and/or other resources. Set of executable application resources 106 can comprise a Web application framework to permit collaboration server 102 to serve applications to one or more users in a set of users 108 via one or more networks 118. One or more networks 118 can be or include the Internet, or other public or private networks. Set of users 108 can include, for instance, anonymous public users, registered or authenticated users, or other users who wish to access collaboration space 110, for example, to participate in the development of applications or other software.

Figure 2:
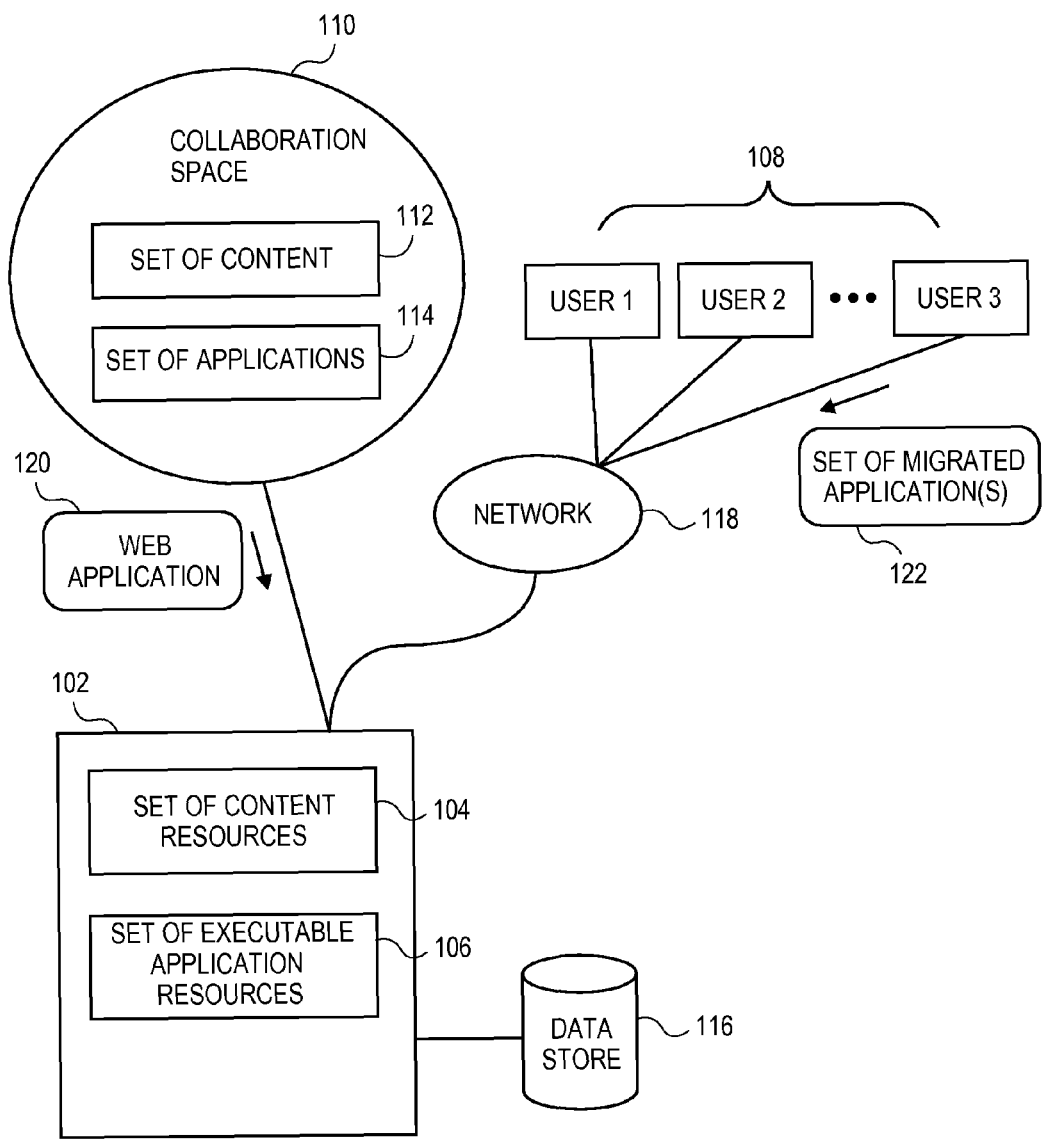
FIG. 2 illustrates an overall system for managing a collaboration space having application hosting capabilities, according to various embodiments in further regards.

As shown in FIG. 2, in operation the collaboration space 110 can present a set of content 112 and a set of applications 114 to any one or more users in the set of users 108 who access the collaboration space 110. In embodiments, one or more applications in the set of applications 114 can be executed or instantiated via the set of executable application resources 106 of collaboration server 102. In embodiments, the one or more executed or instantiated applications can be generated as a Web application 120, and transmitted to users in the set of users 108 via one or more networks. In embodiments, the collaboration space 110 can be configured to permit users in the set of users 108 to transmit or upload a set of migrated applications 122 directly to the collaboration space 110. The set of migrated applications 122 can comprise remotely generated application code, languages, or other resources that can access the set of executable application resources 106 once received in collaboration space 110. In embodiments, the set of migrated applications 122 can be stored to data store 116, or other sites or storage. In embodiments, users in the set of users 108 can instead or in addition start and generate applications or other software entirely within collaboration space 110.

Figure 3:
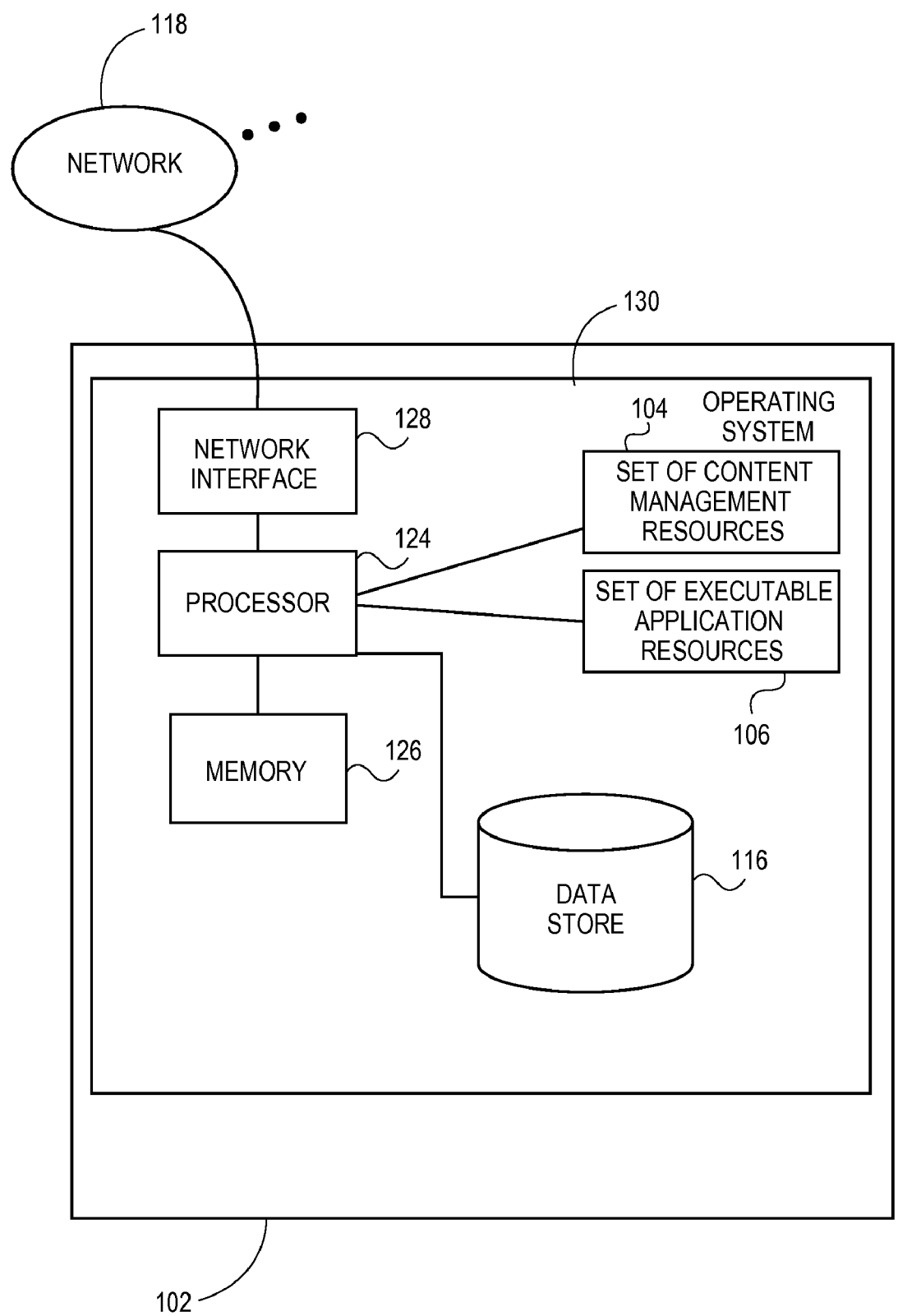
FIG. 3 illustrates an exemplary hardware configuration of a collaboration server that can be used in systems and methods for managing a collaboration space having application hosting capabilities, according to various embodiments.

FIG. 3 illustrates an exemplary diagram of hardware and other resources that can be incorporated in collaboration server 102 supporting collaboration space 110, collaboration space 110 in turn being configured to communicate with a set of users 108 via one or more networks 118, according to various embodiments. In embodiments as shown, the collaboration server 102 can comprise a processor 124 communicating with memory 126, such as electronic random access memory, operating under control of or in conjunction with operating system 130. Operating system 130 can be, for example, a distribution of the Linux™ operating system, the Unix™ operating system, or other open-source or proprietary operating system or platform. Processor 124 can also communicate with the data store 116. Processor 124 further communicates with network interface 128, such as an Ethernet or wireless data connection, which in turn communicates with one or more networks 118, such as the Internet or other public or private networks. Processor 124 can also communicate with the memory 126, the network interface 128, and the data store 116 to execute control logic and perform processing to carry out collaboration space management as described herein. Processor 124 can further communicate with set of content management resources 104 and/or set of executable application resources 106, to execute management functions in the collaboration space 110. Other configurations of the collaboration server 110, associated network connections, and other hardware and software resources are possible.

Figure 4:
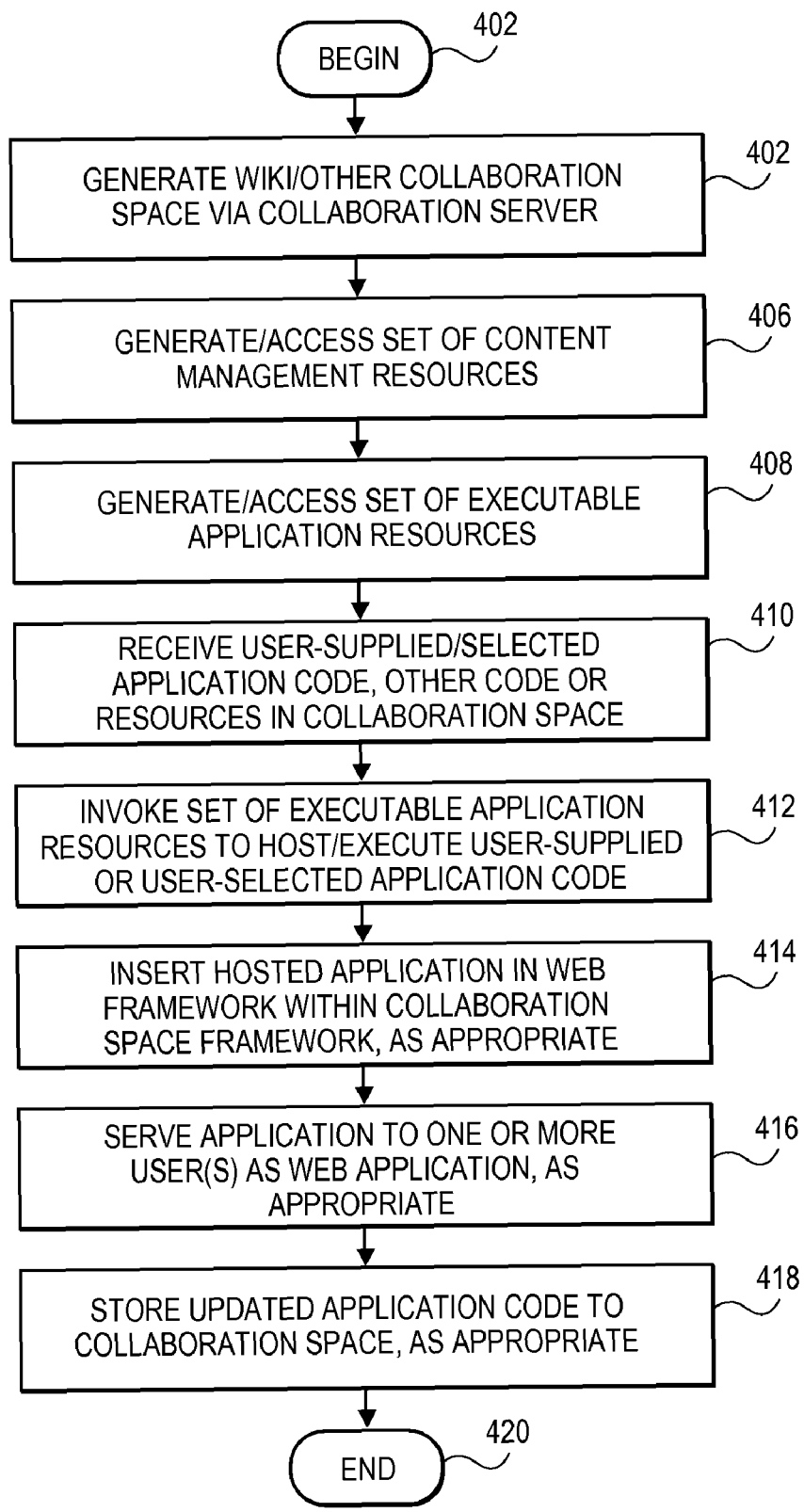
FIG. 4 illustrates a flowchart of overall management processing for collaboration spaces having application hosting capabilities, according to various embodiments.

FIG. 4 illustrates overall processing for application development using a middleware platform, according to embodiments. In 402, processing can begin. In 404, a collaboration space 110, such as a wiki site, can be generated via collaboration server 102. In 406, the collaboration server 102 can generate and/or access a set of content management resources 104 in the collaboration space 110. In 408, the collaboration server 102 can generate and/or access a set of executable application resources 106 in the collaboration space 110. In embodiments, the set of executable application resources 106 can be or include, for example, programming language resources, such as interpreters, compilers, or other tools or platforms to access, modify, and/or execute application code in collaboration space 110. In embodiments, set of executable application resources 106 can include, for example, languages or platforms such as Python, PERL, Ruby on Rails, Visual Basic™ available from Microsoft Corp., or other languages, platforms, and/or other resources to support hosted applications in collaboration space 110.

In 410, the collaboration space 110 can receive user-supplied and/or user-selected application code, or other code or resources. For example, collaboration space 110 can receive an upload of application code from one or more of set of users 108. In embodiments, the application code can in addition or instead be or include code stored in or retrieved from data store 116. In 412, collaboration server 102 can invoke or interface to set of executable application resources 106 to host, instantiate, and/or execute the user-supplied or user-selected application code in collaboration space 110. For example, set of executable application resources 106 can be invoked to compile or interpret code, and instantiate or execute any resulting executable code.

In 414, the application hosted by or instantiated in collaboration space 110 can be inserted into a Web framework within the framework of the collaboration space 110. For example, collaboration server 102 can configure network ports and/or other network connections and resources, such as security resources, to transmit or serve the application as a Web application to one or more remote users. In 416, the application hosted by or instantiated in collaboration space 110 can be transmitted or served to one or more recipient users in set of users 108, for example, via a secure channel via network 118. In 418, any updated application code and/or other resources can be stored to data store 116 or other data sites or storage, as appropriate. In 420, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which one collaboration server supports a collaboration space and the set of users who participate in that space, in embodiments multiple servers or hosts can support the wiki site or other collaboration environment. Similarly, while embodiments have been described in which one collaboration host supports one collaboration space, in embodiments, one or more collaboration servers can support multiple wiki sites or other collaboration spaces. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:

hosting, by a collaboration server, in a collaboration space,
  a set of executable local applications generated in the collaboration space, and
  a set of executable migrated applications generated remotely from the collaboration space and migrated to the collaboration space;

hosting a set of executable application resources in the collaboration space permitting a set of users to execute at least one application in the collaboration space selected from the set of executable local applications and the set of executable migrated applications;

accessing the at least one executed application in the collaboration space; and configuring the at least one executed application to be served to at least one user in the set of users via a Web framework.

2. The method of claim 1, wherein the collaboration space comprises a wiki site.

3. The method of claim 1, wherein the set of executable application resources comprises an interpreted execution environment for the at least one application.

4. The method of claim 1, wherein the at least one application comprises at least one of a Python application, a Ruby on Rails application, a PERL application, and a Visual Basic application.

5. The method of claim 1, wherein the set of executable application resources is incorporated in the Web framework within the collaboration space.

6. A system comprising:

an interface to a set of users via a network;

a collaboration hosting engine, communicating with a set of users via the interface, the collaboration hosting engine being configured to host, in the collaboration space,
a set of executable local applications generated in the collaboration space, and
a set of executable migrated applications generated remotely from the
collaboration space and migrated to the collaboration space, host a set of executable application resources in the collaboration space permitting the set of users to execute at least one application in the collaboration space selected from the set of executable local applications and the set of executable migrated applications, access the at least one executed application in the collaboration space, and configure the at least one executed application to be served to at least one user in the set of users via a Web framework.

7. The system of claim 6, wherein the collaboration space comprises a wiki site.

8. The system of claim 6, wherein the set of executable application resources comprises an interpreted execution environment for the at least one application.

9. The system of claim 6, wherein the at least one application comprises at least one of a Python application, a Ruby on Rails application, a PERL application, and a Visual Basic application.

10. The system of claim 6, wherein the set of executable application resources is incorporated in the Web framework within the collaboration space.

11. An executable software application, the executable software application being generated by a method comprising:

hosting, by a collaboration server, in a collaboration space,
a set of executable local applications generated in the collaboration space, and
a set of executable migrated applications generated remotely from the collaboration space and migrated to the collaboration space;

hosting a set of executable application resources in the collaboration space permitting a set of users to execute at least one application in the collaboration space selected from the set of executable local applications and the set of executable migrated applications;

accessing the at least one executed application in the collaboration space; and configuring the at least one executed application to be served to at least one user in the set of users via a Web framework.

12. The executable software application of claim 11, wherein the collaboration space comprises a wiki site.

13. The executable software application of claim 11, wherein the set of executable application resources comprises an interpreted execution environment for the at least one application.

14. The executable software application of claim 11, wherein the at least one application comprises at least one of a Python application, a Ruby on Rails application, a PERL application, and a Visual Basic application.

15. The executable software application of claim 11, wherein the set of executable application resources is incorporated in the Web framework within the collaboration space.

* * * * *